(No Model.)

W. H. FOWLER.
VEHICLE AXLE.

No. 287,921.

Patented Nov. 6, 1883.

Witnesses
W. M. Bjorkman
Edwin F. Dimock

Inventor
Willie H. Fowler,
By Simonds & Burdett,
Attys.

UNITED STATES PATENT OFFICE.

WILLIE H. FOWLER, OF EAST HARTFORD, CONNECTICUT.

VEHICLE-AXLE.

SPECIFICATION forming part of Letters Patent No. 287,921, dated November 6, 1883.

Application filed July 27, 1883. (No model.)

*To all whom it may concern:*

Be it known that I, WILLIE H. FOWLER, of East Hartford, in the county of Hartford and State of Connecticut, have invented certain new and useful Improvements in Axles; and I do hereby declare that the following is a full, clear, and exact description thereof, whereby a person skilled in the art can make and use the same, reference being had to the accompanying drawings, and to the letters of reference marked thereon.

Like letters in the figures indicate the same parts.

Figure 1:
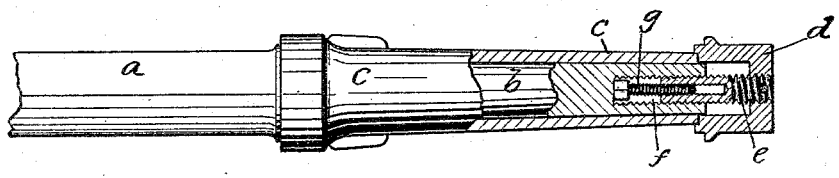
Figure 2:
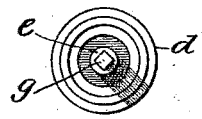

Figure 1 is a side view of an axle-arm embodying my improvements, parts being cut away to show details of construction. Fig. 2 is a front view of the nut and set-screw.

My invention relates to the class of devices used to take up the wear of axles and parts bearing immediately upon the arm.

It consists of the hollow nut, bearing a threaded shaft adapted to operate in a socket in the outer end of the axle-arm, which shaft also bears another and smaller threaded shaft or set-screw, by means of which the position of the nut is fixed with relation to the outer end of the axle-box or hub, as hereinafter more fully explained.

In the accompanying drawings, the letter *a* denotes part of a metallic axle of ordinary construction; *b*, the axle-arm; *c*, the axle-box; and *d* a hollow or cup-shaped nut, bearing the threaded shaft *e*, projecting centrally from the hollow side, and adapted to fit and operate in the threaded socket *f* in the outer end of the axle-arm. The interior diameter of the nut is such that the end of the axle-arm fits within it without friction. This shaft *e*, fast to the nut, has a central longitudinal socket, open on the end toward the axle, and in this socket is fitted the smaller-threaded shaft *g* in such manner that the distance that it projects from the shaft *e* may be determined or adjusted by rotating it. The thread cut upon this shaft *g* is left-handed, or contrary to that upon shaft *e*.

In the ordinary form of axle-arm, in which the nut is secured upon a thread cut on the outer end of the axle-arm, and bearing directly against the shoulder on the arm and the outer end of the box, the endwise wear of the parts can be taken up only by recutting, or rather extending, the thread upon the arm, so that the nut may follow the wear. I remove this necessity for recutting, which generally involves the sending of the vehicle to the shop and the loss of several days' use, by means of my improvement, which operates as follows:

The box having been driven into the hub in the usual manner, and the wheel in condition for use, it is then slipped upon the axle-arm until the inner end bears upon the shoulder between the axle and arm. The shaft *g* is adjusted in shaft *e* until the head of shaft *g* bears upon the bottom of socket *f* just as the slightly-recessed edge of the sides of the nut *d* bears against the outer end of the box. The parts are now in shape for use until the wear upon the end surfaces in contact has loosened the box upon the arm, and then to take up this space and remove the end contacts the nut is unscrewed and the shaft *g* turned, so as to decrease its projection from the shaft *e*, and returned to place. This is an operation that is easily understood, and the wear is compensated, as often as may be required, readily and speedily.

I claim as my invention—

1. In combination, the axle-arm *b*, having the threaded socket *f*, the box *c*, and the hollow nut *d*, bearing the threaded shaft *e*, having the adjustable shaft *g*, all substantially as described.

2. In combination, the axle-arm *b*, having the threaded socket *f*, the hollow nut *d*, having the fixed shaft *e* and adjustable shaft *g*, and the hub of the wheel, adapted to fit upon the axle-arm, all substantially as described.

WILLIE H. FOWLER.

Witnesses:
CHAS. L. BURDETT,
EDWIN F. DIMOCK.